United States Patent [19]
Baudouin et al.

[11] 3,970,995
[45] July 20, 1976

[54] SLAVING CALCULATOR CHIPS

[75] Inventors: Daniel Adrian Baudouin, Houston, Tex.; John R. Dumas, Tempe, Ariz.

[73] Assignee: Texas Instruments Incorporated, Dallas, Tex.

[22] Filed: Feb. 27, 1974

[21] Appl. No.: 446,176

[52] U.S. Cl. ............................ 340/172.5; 307/269
[51] Int. Cl.² .......................................... G06F 11/00
[58] Field of Search ................. 340/172.5, 146.2; 235/156; 307/269; 328/72, 97

[56] References Cited
UNITED STATES PATENTS

| | | | |
|---|---|---|---|
| 3,471,686 | 10/1969 | Connell | 340/146.2 X |
| 3,668,431 | 6/1972 | Locke | 328/97 X |
| 3,725,793 | 4/1973 | Phillips | 307/269 X |
| 3,800,129 | 3/1974 | Umstattd | 235/156 |
| 3,810,119 | 5/1974 | Zieve et al. | 340/172.5 |

Primary Examiner—Jerry Smith
Attorney, Agent, or Firm—Harold Levine; John G. Graham

[57] ABSTRACT

An electronic calculator or data processing system implemented on semi-conductor chips to operate several chips in synchronism where at least one element common to the operation of all chips is responsive to sequentially generated operating states.

A master clock applies clock pulses to the clock input terminal of one chip.

A control gate is provided in the circuit leading to the clock input terminals of the other chip or chips.

A comparator is connected to selected operating state output terminals from both or all of said chips and is connected to the control gate for inhibiting flow of clock signals to the other chip or chips so long as said selected states differ.

7 Claims, 1 Drawing Figure

SLAVING CALCULATOR CHIPS

This invention relates to optimizing utilization of calculator components and more particularly to a method and system for slaving a plurality of calculator chips together in order that a plurality of components may be utilized in each of several functions and whereby functions that none of the chips singly could perform can be accomplished while resolving the problem of synchronizing operations on different chips.

In the early art, calculators were implemented in integrated circuit form in which a plurality of individual LSI chips were employed. Included in such chips were a clock generator together with a timing generator that produced a plurality of timing outputs. Such output signals were then channeled to each of the chips necessary in an overall calculator system to regulate the timing portions required of the calculator.

In later art, particularly with the advent and perfection of MOS technology, complete calculator circuits are included in a single MOS chip. Associated with such chips are common elements such as an input keyboard, an output display, and a power supply.

Various types of calculator chips are available, each tailored to perform different sets of functions. A powerful repertoire can be achieved by combining multiple chips in a single unit. However, because of the nature of the units themselves, it is difficult to achieve desired synchronization. This is because individual chips operate in accordance with independent timing generators. The state of the various chips may be totally independent of each other and in an unknown relationship.

The present invention provides for a synchronization of a plurality of chips where there exists an external clock. The system operates such that all chips employed in accordance with the present invention are synchronized to the same state regardless of the state in which the chip is found at start-up.

More particularly, in accordance with the present invention, a system clock generator is connected to the clock input terminal of a first chip. The system clock signal is also connected to a system clock input terminal of another chip by way of a gate. A selected state dependent signal from the first chip is then compared with the state dependent signal from the other chip. In response to such comparisons, the gate is inhibited unless and until the selected state from the two chips are the same. The system clock is inhibited from driving one or more subsidiary chips so long as the subsidiary chips are not at the same state as the principal chip.

The novel features believed characteristic of the invention are set forth in the appended claims. The invention itself, however, as well as further objects and advantages thereof, will be best understood by reference to the following detailed description of an illustrative embodiment, when read in conjunction with the accompanying drawings, wherein:

Figure 1:
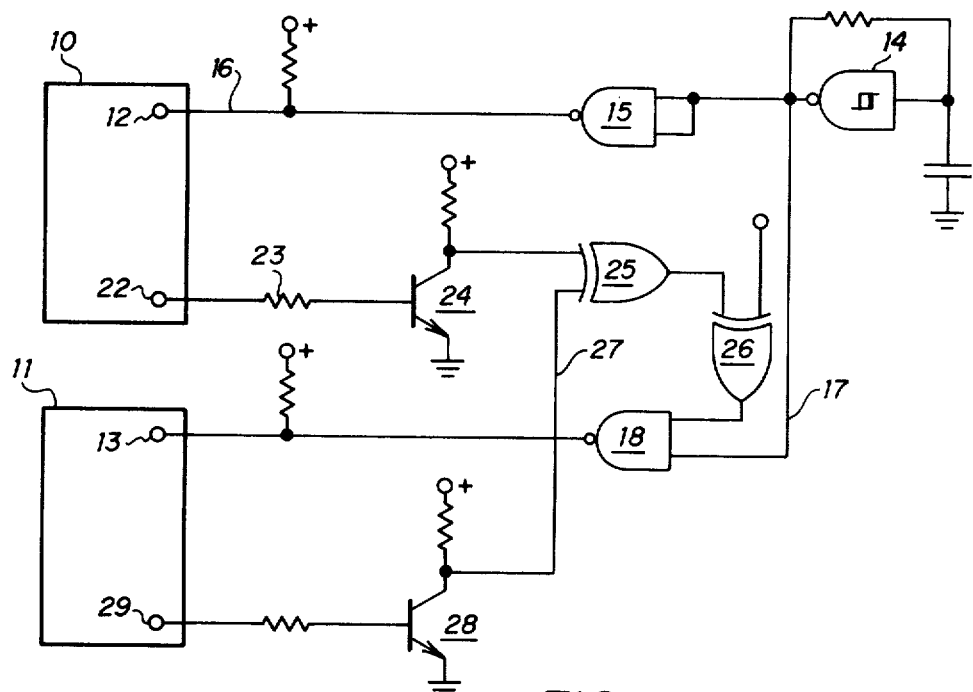
FIG. 1 illustrates a first embodiment of the present invention wherein two chips are synchronized from a system clock using transistor-transistor logic circuitry.

Referring now to FIG. 1, two calculator chips 10 and 11 are illustrated. The calculator chips may be of the type generally illustrated and described in the design manual TMS 0100 NC MOS/LSI One-Chip Calculator Series for Design Engineers, published by Texas Instruments Incorporated of Dallas, Texas. Chips of this character are manufactured and sold by Texas Instruments Incorporated as a component of the Datamath Calculator 2500.

In FIG. 1 the chip 10 is provided with a system clock input terminal 12. Chip 11 is provided with a system clock input terminal 13. A system clock 14 is provided generally operating, for instance, at a pulse repetition rate of the order of 125 Kilohertz. The output of clock 14 is applied by way of a driver 15 and line 16 to the clock input terminal 12. Clock 14 is also connected by way of lines 17 and a NAND gate 18 to the clock input terminal 13. Thus in the configuration here shown, the chip 10 is designated as a master chip. So long as the power is turned on chip 10 will respond to signals entered by way of a keyboard conventionally implemented on such hand calculators to produce a multi-digit display. In the TI 2500 Calculator, the display provides eight digits together with additional function capabilities. The displays are enabled by the generation of suitable timing pulses which generally are identified as the D series. As indicated in the TMS 0100 manual above identified, the TI 2500 Calculator employs digit times (D series) which are represented by a D1-D11 series of timing pulses or output states to a display which control the digits cyclically to be energized in a display unit. According to the embodiment of the invention of FIG. 1, the D11 state appearing at terminal 22 of chip 10 is connected by way of resistor 23 and transistor 24 to an exclusive OR gate 25 and, by way of an inverter gate 26, to the second input of NAND gate 18. A second input of exclusive OR gate 25 is connected by way of line 27 to the collector of transistor 28. The base of transistor 28 is driven from the D11 terminal 29 of chip 11.

By operation of the circuit shown in FIG. 1, energization of the two chip systems will immediately result in operation of chip 10 in response to and under control of the signal from clock 14. However, the operation of chip 11 may be inhibited until such time as the state appearing at terminals 22 and 29 agree. For such period of time as they do not agree the flow of clock pulses through gate 18 to terminal 13 is inhibited so that the chip 11 temporarily is disabled.

This system will operate in the above manner by reason of the fact that in MOS type circuits, the clock can be stopped for short periods of time during which the MOS components will hold charge and not lose data stored therein. Thus, as shown in FIG. 1, the selected states D11 on chips 10 and 11 as they appear at terminal 22 and 29 are employed to achieve, in a relatively simple and unique fashion, synchronization of the two chips. By this means, the common components, such as power supply, clock, keyboard and display may all be utilized by the several chips thus providing a more powerful calculator system with optimization of utilization of the common components.

In the example shown in FIG. 1, it is noted that the D11 states are employed for comparison. It will be readily appreciated that different states may just as well be selected while achieving the same end. Further, if desired, the synchronization can be skewed. By this, it is meant that the D4 state of chip 10 could be compared with the D5 state or any other state of chip 11. The systems would not then be synchronized to exactly the same states, but for special purposes predetermined skew may be desired and can readily be achieved.

Figure 2:
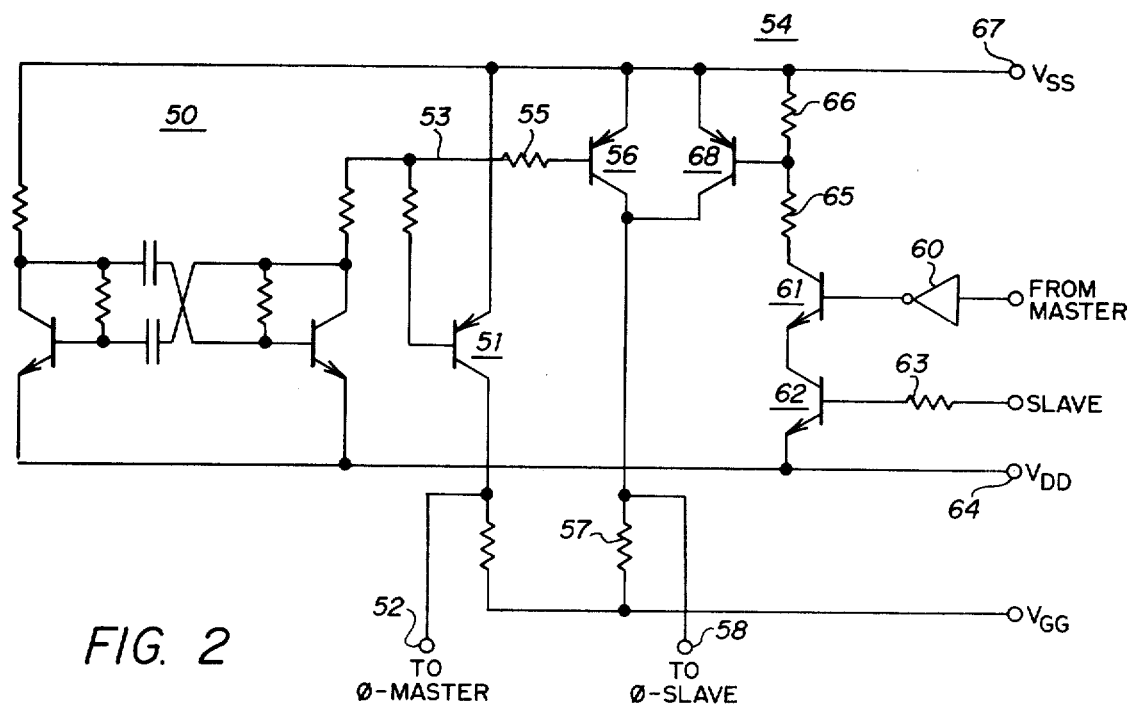
FIG. 2 illustrates a further embodiment representing a preferred form of the invention in which the number of components required is substantially reduced from that shown in FIG. 1.

In FIG. 2, a different form of implementation of the invention is shown wherein the number of components required has been minimized. It will be noted from FIG. 1 that the signals and the circuit values there designated represent implementation using TTL logic. In the system of FIG. 2, a minimum number of transistors is employed to achieve the same result. In this system, the clock 50 has an output transistor 51 which feeds the clock input terminal of the master chip by way of line 52. The clock output line 53 leads to the synchronization circuit 54. The synchronization circuit 54 includes a resistor 55 leading to the base of transistor 56. The collector of transistor 56 is connected by way of resistor 57 to the gate supply voltage source $V_{GG}$. The collector of transistor 56 also is connected by way of lines 58 to the clock input terminal of a second or subsidiary chip not shown.

The selected output state from the master chip is connected by way of an inverter 60 to the base of the transistor 61. Transistor 61 is connected in series with a transistor 62. The selected state output of the slave or secondary chip is connected by way of resistor 63 to the base of a transistor 62.

The emitter of transistor 62 is connected to the drain supply terminal $V_{DD}$. The collector of transistor 61 is connected by way of resistors 65 and 66 to a $V_{SS}$ terminal 67. The juncture between series resistors 65 and 66 is connected to the base of a transistor 68. The collector of transistor 68 is connected to the collector of transistor 56. When the states on the bases of transistors 61 and 62 are different then the clock signal on line 53 will not be transmitted through transistor 56 to line 58, and by this means a subsidiary chip connected to line 58 will be inhibited until synchronized.

Having described the invention in connection with certain specific embodiments thereof, it is to be understood that further modifications may now suggest themselves to those skilled in the art and it is intended to cover such modifications as fall within the scope of the appended claims.

What is claimed is:

1. In an electronic system implemented on semiconductor chips where it is desired to operate in synchronism more than one chip in the system where at least one element common to the operation of both or all chips is responsive to sequentially generated operating states, the combination which comprises:
    a master clock for applying clock pulses to the clock input terminals of said chips,
    means connected to selected operating state output terminals from both or all of said chips for inhibiting flow of clock signals to one of the chips so long as said selected operating states differ.

2. In an electronic system implemented on semiconductor chips where it is desired to operate in synchronism more than one chip in the system where at least one element common to the operation of both or all chips is responsive to sequentially generated operating states, the combination which comprises:
    a master clock for applying clock pulses to the clock input terminal of one of said chips,
    a control gate in the circuit leading from the clock to the clock input terminal of the other of said chips,
    comparator means connected to selected operating state output terminals from both or all of said chips, and
    a connection from said comparator to said gate for inhibiting flow of clock signals to said other of said chips so long as the selected operating states differ.

3. An electronic system implemented on semiconductor chips that synchronizes a plurality of slave chips to a selected state of a master chip, comprising:
    a. a system clock with clock connections leading to all of the chips to control the operation of said slave and master chips,
    b. means for comparing operating state of said master chip with the states of said slave chips, and
    c. means for inhibiting the clock signal to said slave chips until said comparing means indicates identity in operating states.

4. An electronic system implemented on semiconductor chips that synchronizes a plurality of slave chips to a selected state of a master chip, comprising:
    a. a system clock with clock connections leading to all of the chips to control the operation of said slave and master chips,
    b. means for comparing operating state of said master chip with the states of said slave chips, and
    c. means for inhibiting the clock signal to said slave chips until said comparing means indicates identity in operating states, and wherein
    d. said system clock is connected separately to said master and slave by way of parallel transistors,
    e. a control transistor connected in parallel to the transistor leading to said slave,
    f. a pair of series transistors connected to turn off said control transistor when said series transistors conduct,
    g. means to apply to one of said series transistors, a selected state signal from said master,
    h. means to apply to the other of said series transistors a selected state signal from said slave, and
    i. means to invert the signal from one of said master and said slave for transmission of the system clock signal to said slave when said selected state signals are the same.

5. An electronic calculator system implemented on semiconductor chips that synchronizes timing within such chips, comprising:
    a. a plurality of calculator chips,
    b. a system clock generator having a connection leading to each of said chips for clock control of the operation thereof,
    c. means connected to the chips for comparing the timing of operating states within said chips,
    d. means for separately disabling the connections of the clock generator to all but a first of said chips until said comparing means indicates identical timing of operating states between said first of said chips and another one of said chips.

6. A method of synchronizing semiconductor calculator chips which comprises:
    a. generating clock pulses to control the operation of said chips,
    b. comparing a selected operating state of a first of said chips with the same state of the rest of said chips, and
    c. inhibiting said clock pulses to those chips so long as the compared operating states thereof are not identical with the state of said first of said chips.

7. The method of claim 6 in which an inhibit state is applied to those chips not identical, and in which the inhibit state is removed when the state of a given chip corresponds with that of said first chip.

* * * * *